May 29, 1962  W. D. REEVES  3,036,513
ROTARY FRYER
Filed Oct. 13, 1958  3 Sheets-Sheet 1
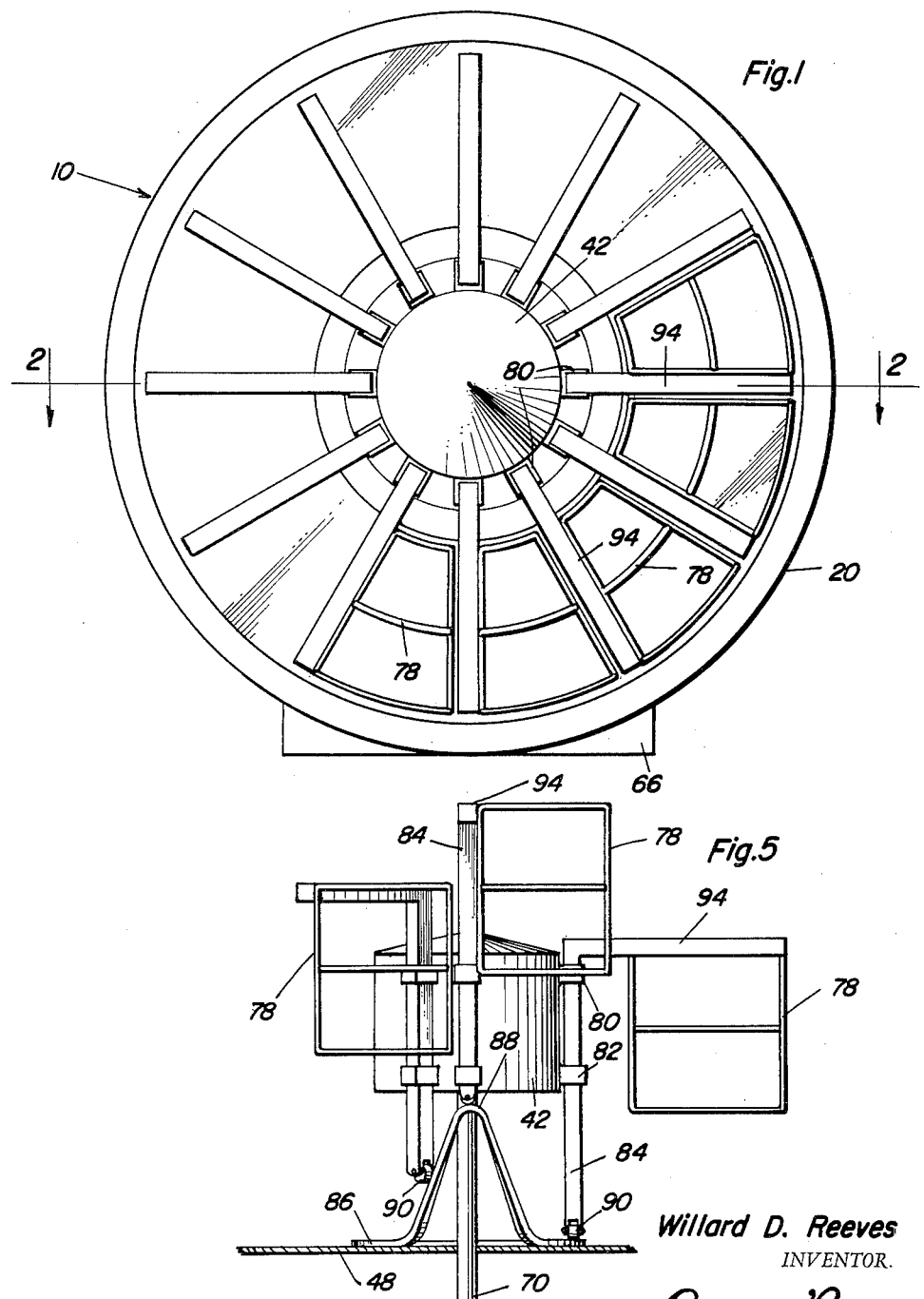
Willard D. Reeves
INVENTOR.

May 29, 1962 W. D. REEVES 3,036,513
ROTARY FRYER
Filed Oct. 13, 1958 3 Sheets-Sheet 2
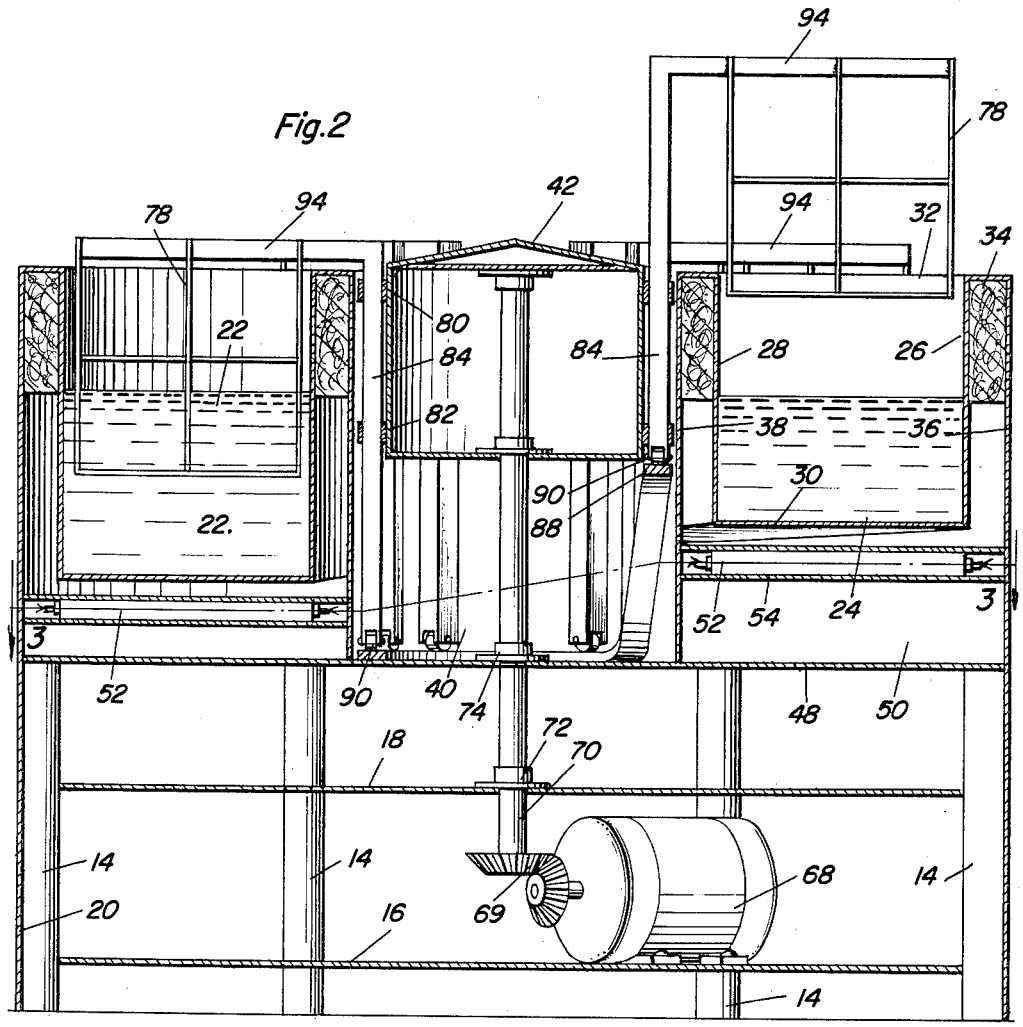
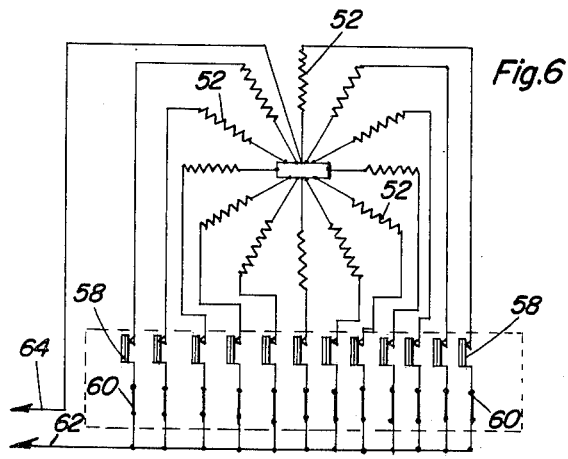
Willard D. Reeves
INVENTOR.
BY Clarence A. O'Brien
and Harvey B. Jacobson
Attorneys May 29, 1962  W. D. REEVES  3,036,513
ROTARY FRYER
Filed Oct. 13, 1958  3 Sheets-Sheet 3

Willard D. Reeves
INVENTOR.

United States Patent Office 3,036,513
Patented May 29, 1962

3,036,513
ROTARY FRYER
Willard D. Reeves, P.O. Box 773, Center, Tex.
Filed Oct. 13, 1958, Ser. No. 766,856
4 Claims. (Cl. 99—404)

This invention relates to cooking apparatus and more particularly to a rotary deep fat fryer.

Although a machine constructed in accordance with this invention is especially useful for cooking portions of food, e.g. chicken, which have been weighed and sold on a pre-cooked basis and then cooked, the principals of the invention are applicable with any type of food that is to be fried in deep fat.

An object of the invention is to provide a new and improved deep fat fryer which has a number of individual baskets adapted to be submerged and removed from a well containing hot fat so that the complete cooking cycle is achieved without the bother of manually removing the baskets from the deep fat. Ordinarily, when food is cooked for sale as mentioned above, it is placed in a basket and immersed in hot fat. Some of the newer equipment is provided with a timer giving a visual and audible signal when the time cycle is complete and thereby requiring the cook to lift the basket from the deep fat. This invention automatically achieves this by lifting the baskets from the deep fat when the cooking cycle is complete. Furthermore, the construction is such that a considerably increased output is achieved since during a single cycle of operation portions of food are in the various stages of cooking, with it being only necessary for the cook to remove the food from the basket that is elevated or otherwise separated from the hot fat.

A further object of the invention is to provide a deep fat fryer which, by its construction, minimizes if not completely obviates hot spots in the cooker as is experienced in gas fired cookers. A multiplicity of heating elements are used at various stations around the well of the rotary fryer, and in addition to this a fat circulation pump which continually draws fat from a low spot in the well, filters it and then returns it to a high spot in the well with sufficient force to circulate the fat.

A further object of the invention is to provide a deep fat fryer to facilitate cooking portions of food by obtaining much better uniformity in the cooking and by demanding less time and attention of the operator.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

FIGURE 1 is a top view of a fat fryer constructed in accordance with the invention.

FIGURE 2 is a sectional view taken on the line 2—2 of FIGURE 1.

FIGURE 5 is a largely diagrammatic view showing how the baskets are lifted at the completion of the cooking of the contents of the baskets.

FIGURE 6 is a diagrammatic view showing the heaters of the fryer or cooker.

Figure 3:
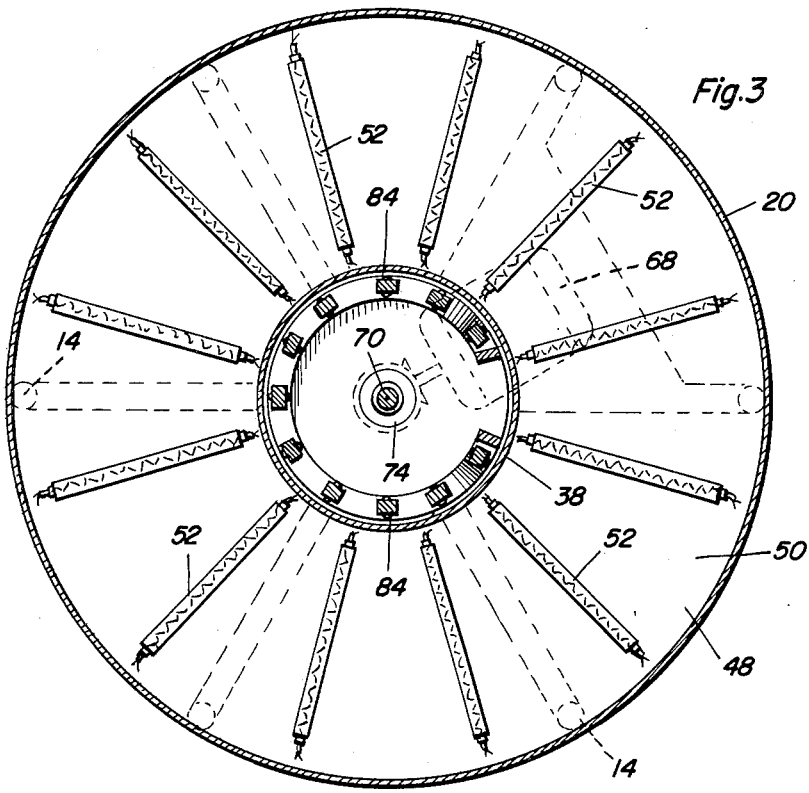
FIGURE 3 is a sectional view taken approximately on the line 3—3 of FIGURE 2.

In the accompanying drawings there is a deep fat fryer or cooker 10 constructed in accordance with the invention. The fryer or cooker is mounted on a support which may assume a number of configurations. One of which is with a plurality of legs 14 to which shelves 16 and 18 are secured and housed within skirt 20 attached to the legs. The well 22 is formed of a tank having an outer cylindrical wall 26, an inner cylindrical wall 28 and a bottom wall 30 and an open top or entrance 32. As shown in FIGURE 2 the tank 24 is well insulated by conventional insulation 34 disposed between side walls 26, 28 and tank walls 36 and 38 joined to the walls 26 and 28 by strips at the upper edges thereof. The wall 38 is cylindrical and open at the top to form an upwardly opening cavity 40 within which rotating drum 42 is disposed. The bottom wall 30 of the tank has a flat portion 44 (FIGURE 4) and it gradually slopes down so that there is a low part 45 in the well 22. Horizontal panel 48 extends across the support or frame of the machine and is attached to the legs 14 and skirt 20. A part of panel 48 constitutes the bottom of cavity 40, and there is a chamber 50 between the remainder panel 48 and the bottom wall 30 of the well 22.

Chamber 50 contains a plurality of heating elements 52, each preferably being electrically operated and radially disposed on heating element support 54 that extends transversely across the chamber 50 and that is attached to skirt 20 and cylindrical wall 38. The heating elements 52 are located a uniform distance from the bottom 30 of the tank or well 22. This is so that the fat in the well will be heated uniformly at its bottom and along the sides of each beneath the insulation 34 that terminates at approximately the suggested fat level in the well. As shown in FIGURE 6 the heating elements are each individually controlled by thermostats 58 that are connected in circuit therewith. Individual fuses 60 are in series with each thermostat 58. A typical circuit includes electric conductors 62 and 64 that are adapted to be connected with a source of electrical potential. Conductor 64 is connected to the inner end of each heating element, and conductor 62 has a group of parallel conductors, one conductor of each of those in the group having fuse 60 and thermostat 58 in series with a single heating element 52. Conventional controls are used in connection with the circuit, and these are preferably located behind instrument panel 66 that is attached to the skirt of the deep fat fryer or cooker. A further control (not shown) is for motor 68.

The motor 68 is a variable speed motor and is attached to shelf 16. Gear train 69 is driven by motor 68, being connected to the output shaft of the motor then to a shaft 70. The shaft 70 extends through bearings 72 and 74 attached to shelf 18 and panel 48 and is secured to the drum 42 to propel the drum. Therefore, by controlling the speed of motor 68, the cooking time cycle may be controlled inasmuch as baskets 78 are moved throughout their cooking cycle by rotation of drum 42.

The drum has a plurality of groups of bearings, for instance bearings 80 and 82 on its side wall. A basket lift arm 84 is slidably mounted in each pair of bearings 82 and 80, and the arm 84 is constrained in its travel by these bearings. The lower ends of each of the arms are disposed on cam 86 attached to the panel 48 and located in cavity 40. Cam 86 has a high part 88 at the high part of well 22 so that lift arms 82 are elevated at that high spot of the well during a single rotation of drum 42. To facilitate movement of the arms on cam 86, each has a wheel 90 at its lower end to establish rolling contact with the cam 86.

Arms 84 are L-shaped and therefore, they have radially extending parts 94 to which wire baskets 78 are attached. The parts 94 of the arms are directly above entrance 32 to the well so that the baskets are lifted and lowered for emergence and immersion of the baskets and food contained in the baskets in the hot cooking fat, oil or the like.

Figure 4:
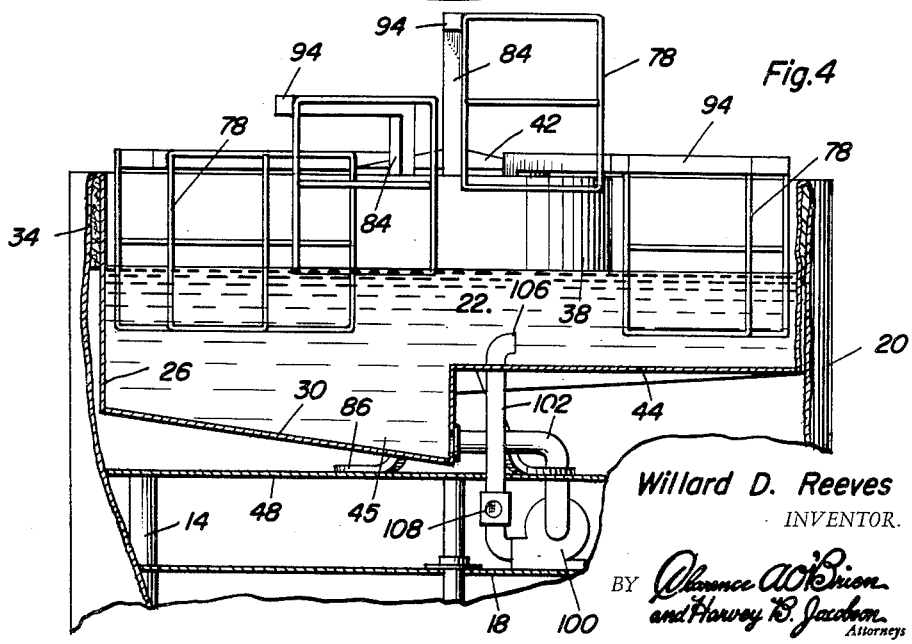
FIGURE 4 is a fragmentary sectional view showing a part of the cooker or fryer.

An important feature of this invention is shown in FIGURE 4. There is a filtering pump 100 attached to shelf 18 and having an inlet conduit 102 in registry with the low part 45 of well 22. The hot cooking fat is continually drawn from the well 45 and discharged through pipe 104. The pipe 104 is attached to the discharge end of pump 100 and has its end 106 constituting a nozzle and located at a high part of well 22. A conventional filter 108 is in pipe 104 in order to clarify the cooking fat. The filtering pump not only functions to keep the fat clear but it also functions to circulate the fat thereby aiding in preventing hot spots in the deep fat fryer or cooker. Furthermore, the filtering pump is used for withdrawing fat from the well for storage or replacement, by connecting the pipe 102 in registry with a storage container or by disconnecting pipe 102 and connecting a different pipe to the outlet of pump 100 or by having a by-pass valve in pipe 102.

In operation the time cycle is adjusted by adjusting the speed of motor 68. This consequently adjusts the amount of time that each basket 78 will be immersed in the cooking fat.

The baskets, as they emerge from the well, are provided with the food that is to be cooked. It is not necessary to stop the motor 68. Then, selecting a typical basket, it is lowered into a well by having the arm 84 that supports the basket rolled down the high part 88 of cam 86. This typical basket remains lowered in the hot cooking fat until the high part of the cam is again reached. Upon reaching the high part of the cam and continued movement of the drum 42, the typical basket is elevated and the contents thereof may be removed.

During the cooking procedure, the cooking fat is continually circulated by the action of the filtering pump thereby minimizing if not completely obviating hot spots in the deep fat fryer. This has the great advantage of enabling thorough, uniform cooking of a greater quantity of food in each basket 78.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a deep fat fryer the combination of a support, a panel carried by said support, a well constructed of a tank that has side walls and a bottom, an inner wall connected with said panel and located interiorly of the side walls of said tank, said tank being cylindrical, said inner wall and said panel constituting a cavity, a rotary drum in said cavity, means connected with said rotary drum for rotating said drum with respect to said tank, a cam in said cavity, a plurality of baskets adapted to be immersed and to emerge from said well, means supporting said baskets on said drum for vertical slidable movement, means connected with said baskets and contacting said cam, said cam having a high part for moving the last mentioned means in a direction to cause the baskets to emerge from said well, electric heaters in the space between the bottom of said well and said panel, a pump having an inlet pipe and an outlet pipe, said well defining a low part thereof, said inlet pipe connected with said well at said low part to withdraw liquid therefrom, said outlet pipe also connected with said well to return the liquid thereto and to under pressure circulate the liquid within the well, a filter in one of said pipes to clarify the liquid as it is withdrawn and returned to the well.

2. In a deep fat fryer the combination of a support, a panel carried by said support, a well constructed of a tank that has side walls and a bottom, an inner wall connected with said panel and located interiorly of the side walls of said tank, said tank being cylindrical, said inner wall and said panel constituting a cavity, a rotary drum in said cavity, means connected with said rotary drum for rotating said drum with respect to said tank, a cam in said cavity, a plurality of baskets adapted to be immersed and to emerge from said well, means supporting said baskets on said drum for vertical slidable movement, means connected with said baskets and contacting said cam, said cam having a high part for moving the last mentioned means in a direction to cause the baskets to emerge from said well, electric heaters in the space between the bottom of said well and said panel, a pump having an inlet pipe and an outlet pipe, said inlet pipe connected with said well to withdraw liquid therefrom, said outlet pipe also connected with said well to return the liquid thereto and to under pressure circulate the liquid within the well, a filter in one of said pipes to clarify the liquid as it is withdrawn and returned to the well, and said pump constituting a portion of means for emptying said well.

3. The combination of claim 2 wherein there are individual thermostatic controls for said heating means, and wherein said heating means comprise a plurality of individual electric heating elements.

4. A device as defined in claim 1 wherein said bottom slopes downwardly from the location in the well at which the baskets emerge therefrom.

References Cited in the file of this patent

UNITED STATES PATENTS

| | | |
|---|---|---|
| 1,234,131 | Cleveland | July 24, 1917 |
| 1,516,962 | Gunsolley | Nov. 25, 1924 |
| 1,961,532 | Snyder | June 5, 1934 |
| 2,546,163 | McBeth | Mar. 27, 1951 |
| 2,614,485 | Sinkwitz et al. | Oct. 21, 1952 |
| 2,715,869 | Salvo | Aug. 23, 1955 |